(12) United States Patent
Eschenburg

(10) Patent No.: US 7,021,721 B2
(45) Date of Patent: Apr. 4, 2006

(54) AXLE HOUSING WITH SUSPENSION FLANGE

(75) Inventor: Dale J. Eschenburg, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 75 days.

(21) Appl. No.: 10/769,162

(22) Filed: Jan. 30, 2004

(65) Prior Publication Data

US 2005/0168057 A1    Aug. 4, 2005

(51) Int. Cl.
*B60B 35/08* (2006.01)
(52) U.S. Cl. .................................. 301/124.1; 301/137
(58) Field of Classification Search ............. 301/124.1, 301/125, 137; 280/124.175; 74/607
See application file for complete search history.

(56) References Cited

U.S. PATENT DOCUMENTS

| 1,252,812 | A | * | 1/1918 | Klocke | ........................ 74/607 |
| 1,841,735 | A | * | 1/1932 | Hufferd et al. | ........... 301/124.1 |
| 2,685,479 | A | * | 8/1954 | Buckendale | ............. 301/124.1 |
| 5,429,423 | A | * | 7/1995 | Pollock et al. | ............ 301/124.1 |
| 6,543,857 | B1 | * | 4/2003 | Griffiths et al. | ............. 301/127 |
| 6,550,869 | B1 | * | 4/2003 | Dantele | .................... 301/124.1 |

* cited by examiner

*Primary Examiner*—Russell D. Stormer
(74) *Attorney, Agent, or Firm*—Carlson, Gaskey & Olds

(57) ABSTRACT

A suspension mount includes a flange formed directly into an axle housing. The axle housing includes a pair of housing halves that are attached to each other along a seam weld. Each housing half includes at least one transversely extending flange. Prior to welding, the flanges from the upper and lower housing halves are aligned with each other to define the suspension mount. The suspension is then attached to the axle housing at the flanges with fasteners or by welding.

17 Claims, 3 Drawing Sheets

HOUSING WALL    FASTENER

AXLE HOUSING WITH SUSPENSION FLANGE

BACKGROUND OF THE INVENTION

The subject invention generally relates to a vehicle axle housing including a suspension flange formed directly into the axle housing.

Medium and heavy duty vehicles include suspensions that are attached to axle housings in various different manners. Traditionally, these suspensions are welded to an immediately adjacent or upper surface of the axle housing, or are clamped to the axle housing to define a suspension mount interface.

The suspension mount interface creates many design challenges. There are a variety of suspension types and each type of suspension can have many different configurations. It is difficult to provide attachment hardware, i.e. brackets, clamps, fasteners, etc., which can accommodate all of these different suspension mount interface variations. Further, the fatigue life of the axle housing can be compromised or decreased in certain bracket attachment configurations. For example, high stress concentrations can be caused by poor geometry configurations for certain types of welded suspension brackets, which results in reduced fatigue life. Or when clamps are used, concentrated reaction areas from bolted brackets can cause high internal stresses due to cyclical deflections within the clamped joint, which causes fatigue to initiate inside the axle housing creating an "oil can effect."

One proposed solution increases wall thicknesses of the axle housing. This reduces high external and internal stress concentrations but adds weight to the axle housing. This increases cost and decreases fuel economy, making the product less competitive.

There is a need for a suspension mount for a vehicle axle that can accommodate many different suspension types, and which does not require increased axle housing wall thickness. The suspension mount should be easily incorporated into existing axle housing configurations and should improve axle housing fatigue life in addition to overcoming the other above-mentioned deficiencies in the prior art.

SUMMARY OF THE INVENTION

A suspension mount interface for a vehicle axle assembly includes suspension flanges formed directly on an axle housing. The flanges extend outwardly from vertical sides of the housing. The vehicle suspension is attached to the axle housing via the flanges. The flanges can be formed on housings for drive axles, non-drive axles, tag axles, pusher axles, trailer axles, or steer axles.

In one disclosed embodiment, the axle housing includes first and second housing halves. Each housing half includes at least one suspension flange that is formed as part of the housing half. The suspension flanges from each housing half are aligned with each other in an overlapping relationship and the housing halves are attached together. The suspension is then fastened or welded to the suspension flanges.

In one disclosed embodiment, each housing half is defined by a C-shaped cross section. Each housing half includes a base portion with a pair of vertically extending side walls. The suspension flanges extend transversely relative to one of the side walls and are formed generally parallel to the base portions. The flange geometry is optimized to transfer suspension loads in a manner that allows greater distribution of stress than conventional attachment methods. This allows axle housing wall thickness to be minimized.

These and other features of the present invention can be best understood from the following specification and drawings, the following of which is a brief description.

DETAILED DESCRIPTION OF THE PREFERRED EMBODIMENT

Figure 1:
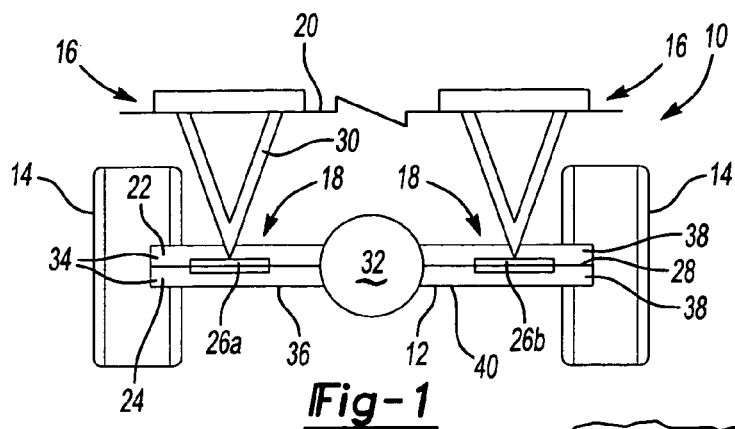
FIG. 1 is a schematic view of an axle assembly and suspension assembly mounted on a vehicle.

An axle assembly is shown generally at 10 in FIG. 1. The axle assembly 10 includes an axle housing 12 that supports a pair of wheels 14 on opposing ends. A vehicle suspension 16 is attached to the axle housing 12 at a suspension mount interface 18. The suspension 16 dampens or absorbs input received from the axle housing 12 via the wheels 14. The suspension 16 is positioned between the axle housing 12 and a vehicle frame 20.

Figure 2A:
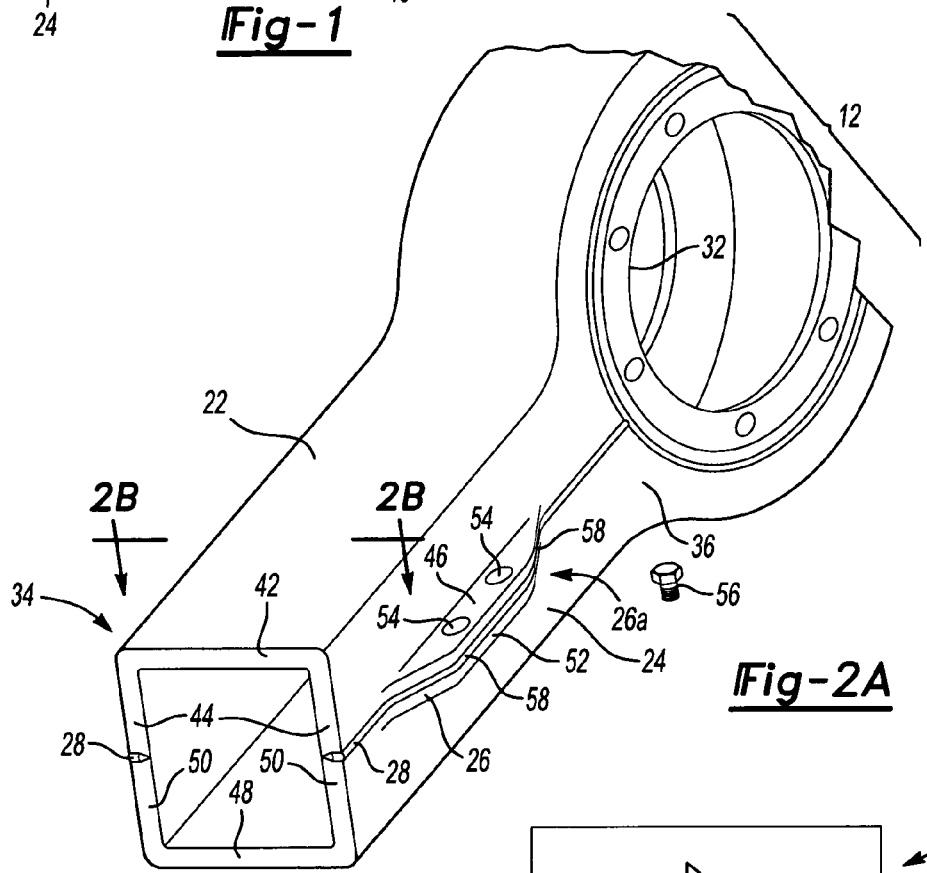
FIG. 2A is a perspective view, partially broken away, of the axle assembly of FIG. 1.
Figure 2B:
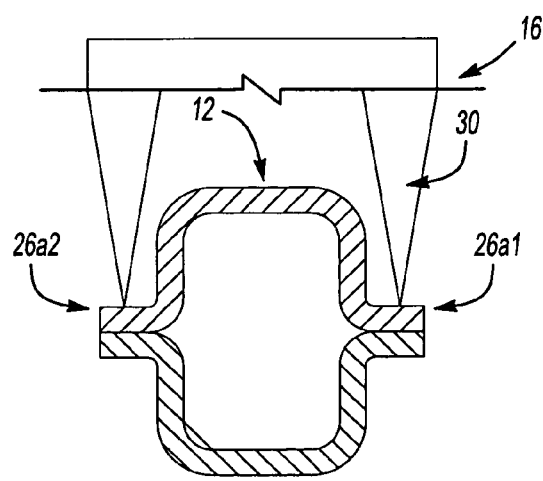
FIG. 2B is a cross-sectional view, taken along line 2B as indicated in FIG. 2A.

The axle housing 12 as shown in FIG. 2A includes a first housing half 22 and a second housing half 24. The housing halves 22, 24 are preferably symmetrical, however non-symmetrical halves could also be used. Suspension flanges 26 are directly or integrally formed as part of each housing half 22, 24. Preferably, the axle housing includes suspension flanges 26 on each end of the axle housing 12. A first set of suspension flanges 26a is formed on one end and a second set of flanges 26b is formed on an opposite end, see FIG. 1. Further, in one embodiment, each set of flanges 26a, 26b, can include flanges on opposing sides of the axle housing 12. For example, as shown in FIG. 2B the first set of flanges 26a includes a fore set of flanges 26a1, and an aft set of flanges 26a2, The second set of flanges 26b are similarly formed.

The flanges 26 from each of the housing halves 22, 24 are aligned with each other in an overlapping relationship and the housing halves 22, 24 are then welded together along a weld interface 28. The weld interface 28 can be positioned at various vertical positions and does not necessarily have to be centered with symmetric housing halves 22, 24. At least one suspension component 30 is attached directly to each set of flanges 26a, 26b.

The axle housing 12 includes a center section 32 with a first leg portion 34 extending outwardly from one side 36 of the center section 32 and a second leg portion 38 extending outwardly from an opposite side 40 of the center section. Preferably, the first set of suspension flanges 26a is formed on the one side 36 of the center section 32 and the second set of suspension flanges 26b is formed on the opposite side 40. This provides a balanced and secure attachment of the suspension 16 to the vehicle frame 20 and the axle housing 12. Further, while the first and second sets of suspension flanges 26a, 26b are shown as being formed on one side of the first and second leg portions 34, 38 in FIG. 2A, as discussed above, it should be understood that flanges 26a, $26a_2$, $26b$, $26b_2$ could also be formed on opposing sides of the first and second leg portions 34, 38, as shown in FIG. 2B.

The first leg portion 34 of the axle housing 12 is shown in FIG. 2A. It should be understood that the second leg portion 38 is similar to the first leg portion 34. The first housing half 22 of the first leg portion 34 includes a generally flat horizontal base member 42 and pair of vertical side walls 44 extending downwardly toward the second housing half 24. A first suspension flange 46 of the first set of flanges 26a extends transversely to one of the vertical side walls 44.

The second housing half 24 of the first leg portion 34 includes a generally flat horizontal base member 48 and a pair of vertical side walls 50 extending upwardly toward the first housing half 22. A second suspension flange 52 of the first set of flanges 26a extends transversely to one of the vertical side walls 50. The first 46 and second 52 suspension flanges are aligned with one another in an overlapping relationship to form the first set of suspension flanges 26a.

Figure 4:
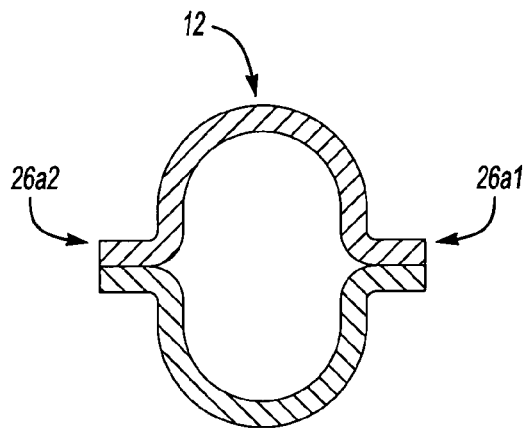
FIG. 4 is a cross-sectional view of an axle housing incorporating the subject invention having a rounded cross-sectional shape.
Figure 5:
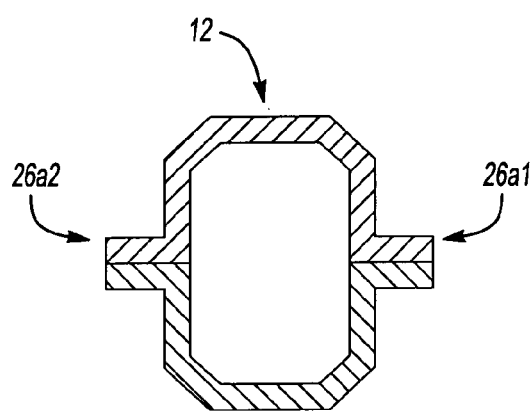
FIG. 5 is a cross-sectional view of an axle housing incorporating the subject invention having a polygonal cross-sectional shape.

As described, the first and second housing halves 22, 24 generally form a C-shape cross-section. The base member 42 of the first housing half 22 forms an upper surface of the axle housing 12 and the base member 48 of the second housing half 24 forms a lower surface of the axle housing 12. The vertical side walls 44 of the first housing half 22 include a first weld interface defined along the distal edges facing the second housing half 24. The vertical side walls 50 of the second housing half 24 include a second weld interface defined along the distal edges facing the first housing half 22. The vertical side walls 44, 50 of the first and second housing halves 22, 24 are then seam welded together along the first and second weld interfaces to form an axle housing 12 having a box shape (i.e. square or rectangular) cross-section at the leg portions 34, 38. Optionally, the axle housing 12 cross-section could be formed from a circular, oval, octagonal, polygonal or other similar shape as shown in FIGS. 4 and 5, for example.

In one embodiment, the flanges 46, 52 include at least one aperture 54 that receives a fastener 56. The suspension component 30 is bolted or otherwise fastened to the flanges 46, 52 by inserting the fastener 56 into the aperture 54. Preferably, multiple fasteners 56 are used to provide a secure attachment interface. Any type of fastener can be used including threaded fasteners, rivets, u-bolts, etc. Optionally, the fastener 56 can be eliminated and the suspension component 30 can be welded directly to the flanges 46, 52. In this configuration, the welding of the suspension component 30 would be away from the flange ends formed into the axle housing 12 to prevent stress concentration effects, thereby preventing adverse impact to fatigue life.

Preferably, the flanges 46, 52 have radiussed corners 58. The formed flange geometry is optimized to transfer suspension loads in a manner that allows a more uniform distribution of stress compared to conventional attachment methods. This allows axle housing wall thicknesses to be reduced without compromising fatigue life of the axle housing 12.

Figure 3:
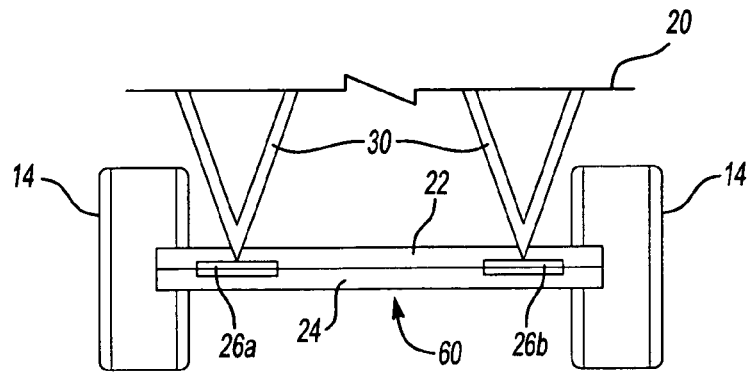
FIG. 3 is a schematic view of an alternate embodiment of an axle assembly.

FIGS. 1 and 2 show a drive axle assembly as one example of an axle assembly 10 that benefits from the suspension mount interface 18. It should be understood that a non-drive axle assembly, shown generally at 60 in FIG. 3, could also benefit from the subject suspension mount interface 18. Further, any type of axle assembly know in the art could utilize the subject invention including steer, tag, pusher, or trailer axles.

Figure 6:
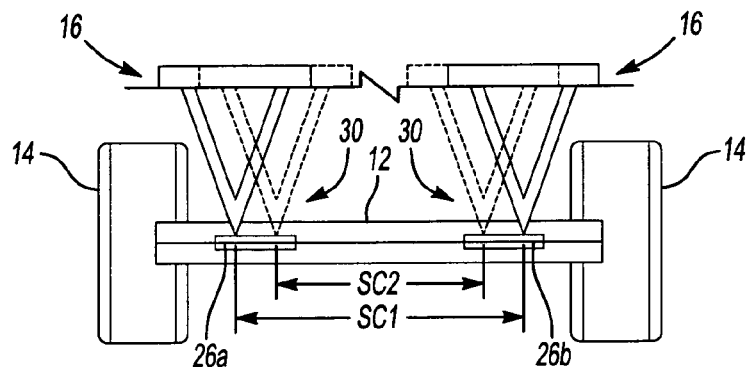
FIG. 6 is a schematic view showing variable spring centers.

As shown in FIG. 6, the use of the first 26a and second 26b sets of flanges can also be used to accommodate variations in suspension spring centers. The same sets of suspension flanges 26a, 26b can be used for suspensions having at least two (2) different spring centers SC1, SC2, with one spring center SC2 being narrower than the other spring center SC1. Thus, various suspension attachment centers can be accommodated by drilling the apertures 54 at different locations along the flanges 46, 52, or by welding at different locations.

Figure 7A:
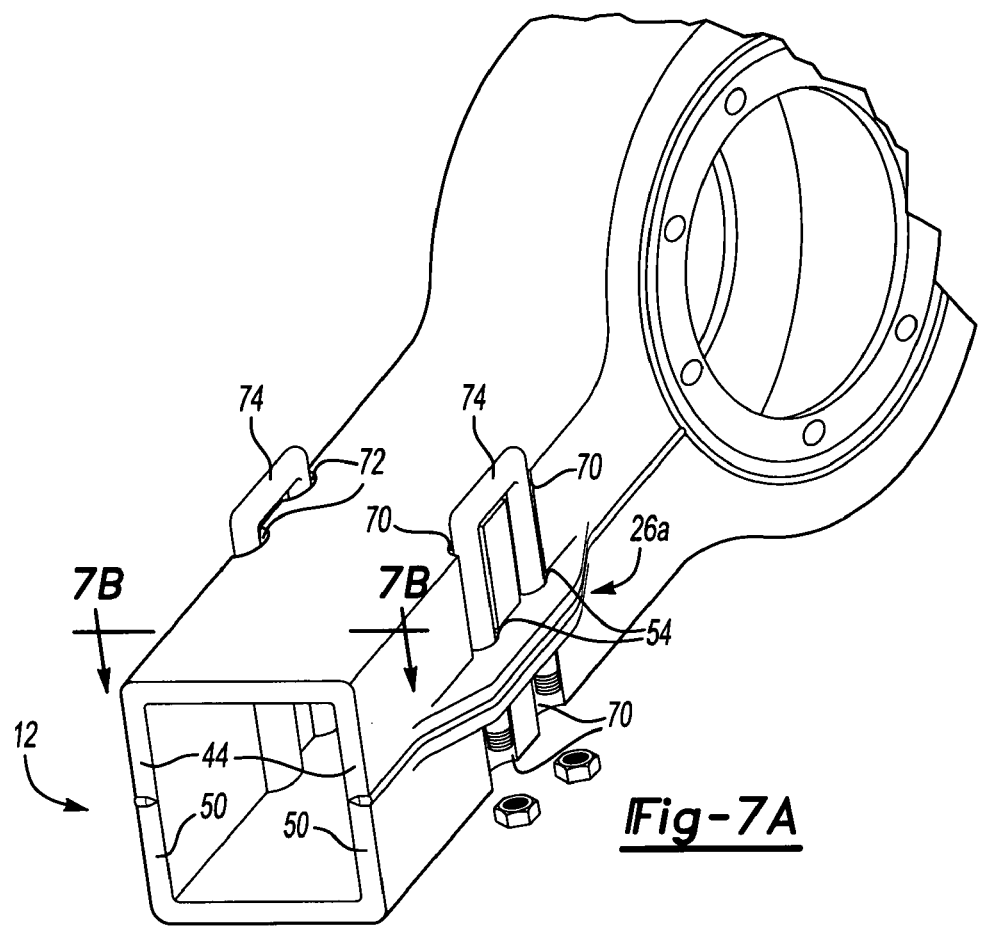
FIG. 7A is a perspective view, partially broken away, of another embodiment of an axle housing incorporating the subject invention.
Figure 7B:
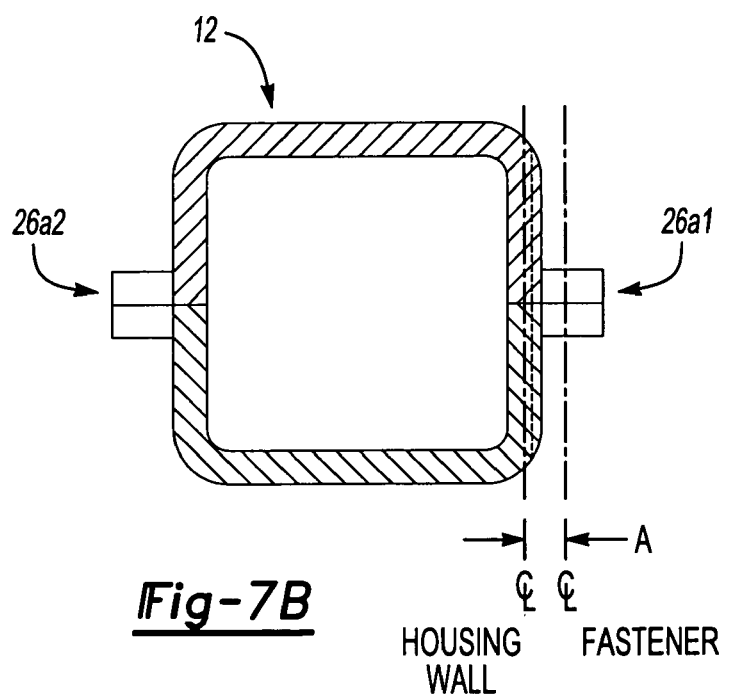
FIG. 7B is a cross-sectional view taken along line 7B as indicated in FIG. 7A.

In another example, shown in FIGS. 7A and 7B, the axle housing 12 includes indentations 70 formed in the vertical side walls 44, 50. The axle housing 12 wall thickness remains generally constant along the lateral length, and indentations 70 can be formed during a hot forming or other similar process known in the art. The indentions 70 form pockets 72 to receive a fastener 74 such as a u-bolt. The indentions 70 in the housing side walls 44, 50 allow suspension attachment and corresponding vehicle load to have a shorter horizontal distance "A", see FIG. 7B, to the housing centerline to reduce the moment. Distance A is defined by the housing wall centerline to the bolt centerline. This also provides a space advantage for brake attachment and a better housing fatigue life.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An axle housing assembly comprising:
   a first housing portion including a first attachment interface and at least one first suspension flange having a first substantially flat engagement surface; and
   a second housing portion including a second attachment interface and at least one second suspension flange having a second substantially flat engagement surface, said at least one second suspension flange being positioned in an overlapping relationship with said at least one first suspension flange such that said first and second substantially flat engagement surfaces are in direct abutting contact to define a suspension mount interface for supporting a suspension load wherein said first and second housing portions are permanently attached to each other along said first and second attachment interfaces.

2. The assembly of claim 1 including a seam weld extending along said first and second attachment interfaces.

3. The assembly of claim 2 wherein said first housing portion includes a first pair of vertical sides, an upper horizontal surface interconnecting said first pair of vertical sides, and a pair of lower weld surfaces formed on distal edges of said first pair of vertical sides with said first attachment interface being defined along said pair of lower weld surfaces, and wherein said second housing portion includes a second pair of vertical sides, a lower horizontal surface interconnecting said second pair of vertical sides, and a pair of upper weld surfaces formed on distal edges of said second pair of vertical sides with said second attachment interface being defined along said pair of upper weld surfaces.

4. The assembly of claim 3 wherein said at least one first suspension flange extends outwardly from at least one vertical side of said first pair of vertical sides proximate said pair of lower weld surfaces of said first housing portion, and said at least one second suspension flange extends outwardly from at least one vertical side of said second pair of vertical sides proximate said pair of upper weld surfaces of said second housing portion.

5. The assembly of claim 4 wherein said at least one first and second suspension flanges are perpendicular to said first and second pairs of vertical side walls, respectively.

6. The assembly of claim 4 wherein said at least one first and second suspension flanges include radiussed corners.

7. The assembly of claim 1 wherein said first and second housing portions each include a center section with a first leg portion extending outwardly from a first side of said center section and a second leg portion extending outwardly from a second side of said center section opposite from said first side, said first leg portion including said at least one first and second suspension flanges forming said suspension mount interface as a first suspension mount interface and wherein said second leg portion includes a third suspension flange formed on said first housing portion and a fourth suspension flange formed on said second housing portion and positioned in an overlapping relationship to said third suspension flange to define a second suspension mount interface.

8. The assembly of claim 1 including at least one aperture formed in each of said at least one first and second suspension flanges and at least one fastener installed within said at least one aperture to secure a suspension component to said first and second housing portions.

9. The assembly of claim 1 including a suspension weld interface defined by at least one of said first and second suspension flanges wherein a suspension component is permanently attached to said first and second housing portions along said suspension weld interface.

10. An axle housing assembly comprising:
a first housing portion including a first attachment interface and at least one first suspension flange; and
a second housing portion including a second attachment interface and at least one second suspension flange positioned in an overlapping relationship with said at least one first suspension flange to define a suspension mount interface for supporting a suspension load wherein said first and second housing portions are permanently attached to each other along said first and second attachment interfaces and wherein said suspension mount interface accommodates a plurality of different suspensions including at least a first suspension having a first spring center and a second suspension having a second spring center that is narrower than said first spring center.

11. An axle housing assembly comprising:
a first housing portion including a first attachment interface and at least one first suspension flange; and
a second housing portion including a second attachment interface and at least one second suspension flange positioned in an overlapping relationship with said at least one first suspension flange to define a suspension mount interface for supporting a suspension load wherein said first and second housing portions are permanently attached to each other along said first and second attachment interfaces and wherein at least one of said first and second housing portions includes at least one indentation extending inwardly toward an axle housing centerline, said indention forming a pocket for a fastener.

12. A method for forming a suspension mount interface on an axle housing comprising the steps of:
(a) forming at least one first suspension flange on a first axle housing half, the at least one first suspension flange presenting a first substantially flat engagement surface;
(b) forming at least one second suspension flange on a second axle housing half, the at least one second suspension flange presenting a second substantially flat engagement surface;
(c) aligning the at least one first and second suspension flanges in an overlapping relationship such that the first and second substantially flat engagement surfaces are in direct abutting contact; and
(d) welding the first and second axle housing halves to each other along a weld interface to define a suspension mount interface with the at least one first and second suspension flanges.

13. The method of claim 12 further including the steps of integrally forming the at least one first suspension flange with the first axle housing half and integrally forming the at least one second suspension flange with the second axle housing half.

14. The method of claim 12 including the step of attaching a vehicle suspension component to the at least one first and second suspension flanges.

15. A method for forming a suspension mount interface on an axle housing comprising the steps of:
(a) forming at least one first suspension flange on a first axle housing half;
(b) forming at least one second suspension flange on a second axle housing half;
((c) forming at least one indentation in a vertical wall of at least one of the first and second axle housing halves;
(d) aligning the at least one first and second suspension flanges in an overlapping relationship;
(e) welding the first and second axle housing halves to each other along a weld interface to define a suspension mount interface with the at least one first and second suspension flanges; and
(f) positioning a fastener within the indentation, and fastening a suspension component to the at least one first and second suspension flanges with the fastener.

16. A method for forming a suspension mount interface on an axle housing comprising the steps of:
(a) forming at least one first suspension flange on a first axle housing half;
(b) forming at least one second suspension flange on a second axle housing half;
(c) aligning the first and second suspension flanges in an overlapping relationship;
(d) welding the first and second axle housing halves to each other along a weld interface to define a suspension mount interface with the at least one first and second suspension flanges; and
(e) defining a first suspension spring center relative to the suspension mount interface using the at least one first and second suspension flanges and defining a second suspension spring center relative to the suspension mount interface using the same first and second suspension flanges wherein the second suspension spring center is narrower than the first suspension spring center.

17. The method of claim 16 including the step of changing from the first suspension spring center to the second suspension spring center by moving a suspension attachment position laterally along the at least one first and second suspension flanges.

* * * * *